United States Patent
Gijsman et al.

(10) Patent No.: US 7,026,028 B2
(45) Date of Patent: Apr. 11, 2006

(54) MULTI-LAYER MOULDING

(75) Inventors: Pieter Gijsman, Beek (NL); Gerardus L. M. Vroomen, Sittard (NL); Edwin Willems, Sittard (NL)

(73) Assignee: DSM IP Assets B.V., (NL)

( * ) Notice: Subject to any disclaimer, the term of this patent is extended or adjusted under 35 U.S.C. 154(b) by 0 days.

(21) Appl. No.: 10/481,134

(22) PCT Filed: Jun. 19, 2002

(86) PCT No.: PCT/NL02/00399

§ 371 (c)(1),
(2), (4) Date: Oct. 12, 2004

(87) PCT Pub. No.: WO03/000492

PCT Pub. Date: Jan. 3, 2003

(65) Prior Publication Data

US 2005/0048238 A1     Mar. 3, 2005

(30) Foreign Application Priority Data

Jun. 22, 2001    (NL) .................................... 1018372

(51) Int. Cl.
*B29D 22/00*    (2006.01)
*B29D 23/00*    (2006.01)
*B32B 1/08*    (2006.01)

(52) U.S. Cl. .................... 428/36.91; 428/36.9; 525/88; 525/92 D; 525/92 E

(58) Field of Classification Search ............... 428/36.9, 428/36.91; 525/88, 92 D, 92 E, 92 A, 91 R, 525/92 F, 92 L See application file for complete search history.

(56) References Cited

U.S. PATENT DOCUMENTS

| | | | |
|---|---|---|---|
| 5,411,785 A | | 5/1995 | Cook |
| 5,907,004 A | * | 5/1999 | Dozeman et al. ............ 524/100 |
| 6,110,546 A | * | 8/2000 | Honda et al. ................. 428/31 |
| 6,462,132 B1 | * | 10/2002 | Willems et al. ............... 525/88 |

FOREIGN PATENT DOCUMENTS

| | | |
|---|---|---|
| EP | 209453 | 1/1987 |
| EP | 564267 | 10/1993 |
| JP | 62 257838 | 11/1987 |
| WO | WO 98/05828 | 2/1998 |

* cited by examiner

*Primary Examiner*—Michael C. Miggins
(74) *Attorney, Agent, or Firm*—Mayer, Brown, Rowe & Maw LLP

(57) ABSTRACT

Multi-layer moulding, containing a body part and a surface layer which at least partly covers the body part, which body part contains a cross-linked elastomer composition and which surface layer contains a thermoplastic elastomer, in which the surface layer of the multi-layer moulding, in a weather resistance test according to DIN 75202, in which the surface layer is continuously exposed for at most 100 hours to light from a xenon light source, which light source is provided with a borosilicate "S" inner filter and a soda lime outer filter, at a relative humidity of 30%, with an intensity of 1.40 W/m$^2$ at 420 nanometres on the surface of the moulding, a black standard temperature of 100° C., in a space with a temperature of 66° C., develops a colour deviation with a $\Delta E$ of at most 3.0, measured according to ASTM D 1925.

13 Claims, No Drawings

MULTI-LAYER MOULDING

CROSS REFERENCE TO RELATED APPLICATION

This application is the National Phase of International Application PCT/NL02/00399 filed Jun. 19, 2002 which designated the U.S., and that International Application was published under PCT Article 21(2) in English.

The invention relates to a multi-layer moulding, containing a body part and a surface layer which at least partly covers the body part, which body part contains a cross-linked elastomer composition and which surface layer contains a thermoplastic elastomer composition.

Examples of multi-layer mouldings are coextruded or laminated profiles and hoses, for instance sealing profiles which are used in building construction and the automotive industry to seal doors and windows against draft and rainwater penetration. Various elastomers are used for the manufacture of the body part of the multi-layer mouldings. The surface of the moulding often has to meet requirements which the elastomer of the body part cannot fulfill. That is the reason why there is a surface layer of a second material.

Thus, in the case of sealing profiles it is important that the elastomers of the body part possess good mechanical properties, such as for instance a high elongation at break, a high tensile strength, a high tear strength and a high flexibility. This mostly makes it necessary to incorporate carbon black as a filler in the elastomer composition. The presence of carbon black in the elastomer composition results in a black appearance of the sealing profile.

For some time already, however, there has been a need for sealing profiles which have a white tint or a chromatic colour. In the automotive industry for instance there is a need to manufacture the sealing profiles in a colour which matches the colour of the car interior or that of the paint of the car. It is sometimes also desirable for the surface of the sealing profile to have a certain coefficient of friction or a certain structure or texture, which are very difficult or not at all realized with the elastomer composition of the body part. From WO 98/5828 is known a multi-layer moulding containing a body part and a surface layer which at least partly covers the body part, which body part contains a cross-linked elastomer composition and which surface layer contains a thermoplastic elastomer.

A drawback of the known sealing profile is that its weathering resistance is insufficient. Thus it may happen that the surface layer discolours in time due to weather effects, resulting in a colour deviation relative to the original colour. It is also possible that matt spots develop on the surface layer or that the surface layer as a whole loses gloss.

From U.S. Pat. No. 6,110,546 a multi-layer moulding is known, containing a body part and a decorative surface layer which at least partly covers the body part, which body part contains a cross-linked elastomer composition and which surface layer contains a thermoplastic elastomer composition.

The decorative surface layer has a light or pale color. In order to prevent discoloration of the decorative surface layer, the thermoplastic elastomer of the surface layer comprises comprises hydrotalcite. A problem is that the hydrotalcite causes porosity in the surface layer, so that no smooth surface is obtained. Furthermore the weather resistance of the surface layer still is insufficient, as shown by the discoloration that takes place already after a short period of exposure under relatively mild conditions (weather resistance measured at a black standard temperature of only 63° C.).

The objective of the invention is to provide a sealing profile of said type which does not have the above-mentioned drawback.

This objective is achieved in that a multi-layer moulding is provided in whose surface layer a colour deviation with a ΔE of at most 3.0 develops in a weather resistance test according to DIN 75202 in which the surface layer is continuously exposed for at most 100 hours, preferably for at most 200 hours, more preferably for at most 300 hours, even more preferably for at most 400 hours, most preferably for at most 500 hours, to light from a xenon light source, which light source is provided with a borosilicate "S" inner filter and a soda lime outer filter, at a relative humidity of 30%, with an intensity of 1.40 W/m$^2$ at 420 nanometres on the surface of the moulding, a black standard temperature of 100° C., in a space with a temperature of 66° C. (also indicated by dry bulb temperature).

Surprisingly, such a sealing profile can be obtained by choosing the elastomer composition in the body part in such a way that said objective is achieved.

It is highly unexpected that due to the choice of the elastomer composition in the body part the good results concerning the weather resistance of the surface layer are obtained, as the surface layer is subjected to weather effects and it is the body part, by contrast, that is screened by the surface layer.

It is possible for the multi-layer moulding to consist of the surface layer and the body part. It is also possible that besides the body part other parts are present. Thus, a hose for instance can comprise the surface layer, the body part and a liner on the inner wall of the hose. A profile for instance can comprise, in addition to the surface layer and the body part, a component of metal or hard plastic to support the profile. It is also possible that the body part comprises a reinforcement of plastic fibres or steel wire. Examples of multi-layer mouldings are given in U.S. Pat. No. 6,110,546 and in U.S. Pat. No. 5,411,785.

A profile can have a surface layer which covers the entire surface layer of the body part. A profile often has a surface layer which partially covers the surface of the body part, for instance only the parts of the profile which after assembly are subjected to weather effects. The surface layer of the multi-layer layer moulding has a thickness of for instance between 50 μ and 1 mm. Preferably the thickness is between 75 and 200 micron.

Examples of elastomers which are very suitable for use in the body part of the multi-layer moulding according to the invention are styrene-butadiene rubber (SBR), nitrile butadiene rubber (NBR), hydrogenated nitrile-butadiene rubber (H-NBR), natural rubber (NR), synthetic isoprene rubber (IR). Preferably, elastomers obtained by the polymerization of ethene and an alpha olefin and elastomers obtained by the polymerization of ethene, an alpha olefin and one or more non-conjugated polyenes are used. The α-olefin used for these elastomers is for instance an α-olefin with 3–10 carbon atoms. Examples thereof are propene, butene, hexene, octene, etc. Preferably, propene is used. Elastomers obtained by the polymerization of ethene and propene are referred to as 'EPM', elastomers obtained by the polymerization of ethene, propene and one or more non-conjugated polyenes are referred to as 'EPDM'.

The weight ratio between ethene and α-olefin in the elastomer is preferably between 90/10 and 20/80. Preferably, the weight ratio between ethene and α-olefin is between 70/30 and 40/60.

Examples of non-conjugated polyenes to be applied in the elastomers are 5-ethylidene-2-norbornene, 5-vinyl-2-norbornene, dicyclopentadiene or 1,4 hexadiene or mixtures thereof. EPDM and EPM for instance can be prepared by polymerization with the aid of a Ziegler-Natta catalyst or a metallocene catalyst.

Besides the elastomer, the elastomer composition of the body part contains for instance oil, fillers, such as carbon black, silica, talcum, chalk, and pigments.

The elastomer composition preferably contains 10–120, more preferably 50–90 parts by weight of oil per 100 parts by weight of elastomer. The oil that is used in the elastomer composition of the body part preferably has an aromatic compounds content of less than 2 wt. %. More preferably, the aromatic compounds content is less than 1 wt. %, even more preferably less than 0.5 wt. %. The polar compounds content of the oil is preferably less than 0.5 wt. %, more preferably less than 0.2 wt. %, even more preferably less than 0.1 wt. %. Good results are obtained if hydrogenated naphtenic oil is used. Preferably oil is used that has been prepared by means of the hydrocracking and isodewaxing process, for instance the Paralux process developed by Chevron.

It is preferred then, if additives, in the form of an elastomer masterbatch, are added to the elastomer composition of the body part, to choose for the masterbatch also such a composition that achievement of good results in terms of the weathering resistance of the moulding is ensured. If the masterbatch contains an oil, an oil is used with a content of aromatic compounds of less than 2 wt. %. More preferably, the content of aromatic compounds is less than 1 wt. %, even more preferably less than 0.5 wt. %. The oil's polar compounds content is preferably less than 0.5 wt. %, more preferably less than 0.2 wt. %, even more preferably less than 0.1 wt. %.

Examples of additives which in the form of an elastomer masterbatch can be added to the elastomer composition of the body part are pigments, drying agents such as for instance calcium oxide, curing agents and accelerators and further processing agents, for instance fatty acids, esters, ethers and alcohols or mixtures thereof.

Good results are obtained if the curing system used for the elastomer composition of the body part is a curing system on the basis of a peroxide. Examples of suitable peroxides are di-tert-butylperoxide, bis(tert-butylperoxyisopropyl)benzene, dicumyl peroxide, butyl 4,4-bis(tert-butylperoxy)valerate, 2,5- bis(tert-butylperoxy)-2,5-methylhexane, 2,5-bis(tert-butylperoxy)-2,5-dimethyl-3-hexyn, tert-butyl 3-isopropenylcumyl peroxide. The elastomer composition contains for instance per 100 parts by weight of elastomer 0.1–10 parts by weight of the peroxide. Preferably the elastomer composition contains 0.4–6, even more preferably 0.5–3 parts by weight of the peroxide per 100 parts by weight of the elastomer.

Good results are obtained if the curing system used for the elastomer composition of the body part is a curing system on the basis of sulphur or a sulphur donor, in combination with one or more accelerators. It is also possible to make use of a compound which acts as a sulphur donor and as an accelerator. Examples of such compounds that give very good results, especially if they are used in the elastomer composition with the above mentioned oil with the low aromatic and low polar content, are thiazoles, thiurams, thiocarbamates and thioates, preferably mercaptobenzothiazoles, thiurams, dothiocarbamates and phosphorusdithioates, more preferably, 2-mercaptobenzothiazole, zinc dibenzyldithiocarbamate and zinc o,o-di-N-butylphosphorodithioate or mixtures thereof are used. These compounds are preferably used in a quantity of 0.25–0.60 parts per 100 parts of elastomer.

Examples of thermoplastic elastomer compositions which are suitable to be used in the surface layer of the multi-layer moulding according to the invention are compositions which contain thermoplastic vulcanisates (TPVs), styrene block copolymers, hydrogenated styrene block polymers or TPOs. A TPO is a mixture which contains 60–30 wt. % of a semicrystalline polyolefin, for instance polypropene or polyethene and 40–70 wt. % of a non-crosslinked rubber, for instance EPDM. Examples of styrene block copolymers are styrene-butadiene-styrene block copolymers (SBS) and styrene-ethene/butadiene-styrene block copolymers (SEBS)

A TPV is a mixture of a thermoplastic polymer and a dynamically crosslinked elastomer, as described for instance in Handbook of Thermoplastic Elastomers, Van Nostrand Reinhold, New York, 1988, Chapt. 4. The TPV used preferably is a mixture of polypropene and a dynamically crosslinked EPDM.

The thermoplastic elastomer composition of the surface layer preferably contains one or more UV stabilizers. Good results are obtained with HALS (Hindered Amine Light Stabilizer) compounds, preferably in an amount of 0.05–5.0 wt. %, even more preferably 0.2–2.0 wt. %.

The TPV preferably contains an oil with an aromatic compounds content of less than 4 wt. %. More preferably, the content of aromatic compounds is less than 2 wt. %, even more preferably less than 1 wt. %. The oil's polar compounds content is preferably less than 0.5 wt. %, more preferably less than 0.2 wt. %, even more preferably less than 0.1 wt. %.

The TPV preferably has a hardness of between 30 Shore A and 55 Shore D, more preferably between 50 Shore A and 80 Shore A.

The benefits of the invention manifest themselves very clearly in the case of multi-layer mouldings whose surface layer has a white tint or a chromatic colour. By this is meant all colours having an L value higher than zero, as defined in ASTM D 1925. More preferably, the surface layer has an L value higher than 10, even more preferably higher than 20.

Preferably, profiles are chosen as multi-layer mouldings. Preferably, sealing profiles are chosen which are meant to be used in the building industry or in the automotive industry, such as for instance sealing profiles for windows and doors.

The multi-layer mouldings can be manufactured by means of coextrusion, as is described for instance in WO 98/5828. It is also possible to extrude the body part in a first step and to laminate the surface layer onto the body part in a second step, as is described for instance in U.S. Pat. No. 5,411,785.

Experiments

Materials Used

TPV-1

Sarlink S5165, comprising 0.3 wt. % Univul 5040H , 0,3 wt. % Chimasorb 944 and 0.5 wt. % DHT-4A (hydrotalcite). The colour was beige.

TPV-2

Sarlink S5165, comprising 0.3 wt. % Univul 5040H, 0.3 wt. % Chimasorb 944 and 0.5 wt. % MgO. The colour was beige.

EPDM-1:

An EPDM compound comprising:

| | |
|---|---|
| EPDM (Keltan ™ 8340A) | 100 parts by weight (pbw) |
| ZnO | 5 |
| Stearic acid | 1 |
| Carbon black N762 | 100 |
| CaCO3 (Omya BSH) | 80 |
| Curing system: | |
| MBT-80 (Mercaptobenzothiazol) | 1.88 |

-continued

| | |
|---|---|
| TMTD-80 (Tetramethylene thiuram disulfide) | 1.25 |
| S-80 (sulphur) | 1.88 |
| Oil: | |
| Sunpar™ 2280 | 75 |

Sunpar™ 2280 is a parafinic oil, having an aromatic content > 2 wt. %.

EPDM-2:

An EPDM-compound according to EPDM 1, however Sunpar™ 2280 is replaced by PenzUltra® 1199, having an aromatic content of 0 wt. %

EPDM-3

An EPDM compound according to EPDM-2, however the curing system is replaced by the following peroxide based curing system:

| | |
|---|---|
| Perkadox ™ 14/40, | 6 pbw |
| Trigonox ™ 29/40 | 3 |
| TMTP (trimethylenepropyl) | 1 |

EPDM-4

An EPDM compound according to EPDM-2, however the curing system is replaced by a different S-based curing system:

| | |
|---|---|
| MBT-80 | 0.64 pbw |
| ZEPC-80 | 2.5 |
| TeDEC-75 | 0.64 |
| S-80 | 1.88 |

ZEPC: zinc ethyl-phenyl dithiocarbamate
TeDEC: Tellurium diethyl dithiocarbamate Sample Preparation On a co-extruder a rubber strip having a TPV surface layer and across-linked EPDM body part was produced according to the method of WO-98/5828, the strip having a width of 200 mm and a total thickness of 2 mm. The thickness of the TPV surface layer was 0.5 mm.

Tests

Weather Resistance

For determining the weather resistance of the rubber strip (surface layer) was continuously subjected according to DIN 75202 to an exposure for fixed periods of time to a xenon light source, which light source was provided with a borosilicate "S" inner filter and a soda lime outer filter, at a relative humidity of 30%, with an intensity of 1.40 W/m$^2$ at 420 nanometres on the surface of the moulding, a standard standar temperature of 100° C., in a space with a temperature of 66° C. (dry bulb temperature).

An Atlas CI 3000 apparatus was used delivered by Atlas.

The discoloration of the surface of the specimen was determined according to ASTM 1925 in an McBeth 2025 plus apparatus delivered by McBeth. The color was calculated according to the CIE-lab method. Measurements were under an angle of reflection of 10 degrees. Geometry of the light source was 45–0.

Comparative Experiments A and B

Samples of EPDM-1 and TPV-1 and TPV-2 wre prepared and tested as indicated above. EPDM-1 is a general purpose EPDM compound. TPV-1 is a thermoplastic vulcanisate comprising UV stabilisers and magnesium oxide. TPV-2 is a thermoplastic vulcanisate as TPV-2, however instead of magnesium oxide the TPV comprises hydrotalcite.

The results are given in Table 1.

EXAMPLES 1 and 2

Samples according to the invention of EPDM-2 and TPV-1 and TPV-2 wre prepared and tested as indicated above. EPDM-2 is based on PenzUltra™ 1199, a white oil, comprising no aromatics. The results are given in Table 1. Very good results are obtained.

EXAMPLES 3 and 4

Samples according to the invention of EPDM-3 and TPV-1 and TPV-2 were prepared and tested as indicated above. EPDM-3 is based on PenzUltra™ 1199, a white oil, comprising no aromatics aromatics and instead of a sulphur based curing system, a peroxide based curing system was used. The results are given in Table 1. Very good results are obtained, even better than the results of EXAMPLES 1 and 2.

EXAMPLES 5 and 6

Samples according to the invention of EPDM-2 and TPV-1 and TPV-2 were prepared and tested as indicated above. EPDM-2 is based on PenzUltra™ 1199, and a sulphur curing system. The results are given in Table 1. Very good results are obtained.

From the results presented in Table 1 it is also clear that with the use of TPV-2, comprising magnesium oxide, instead of TPV-1, comprising the hydrotalcite, always even slightly improved results are obtained.

TABLE 1

ΔE as a function of period of exposure of 100, 200 and 300 hours.

| | | TPV 1 | TPV 2 | TPV 1 | TPV 2 | TPV 1 | TPV 2 |
|---|---|---|---|---|---|---|---|
| | | | | UV ageing (hr) | | | |
| | | 100 | 100 | 200 | 200 | 300 | 300 |
| EPDM 1 | comp. exp. A and B | 40.2 | 38.3 | 38 | 37.8 | 40 | 38 |
| EPDM 2 | examples 1 and 2 | 2.3 | 2.2 | 2.4 | 2.2 | 1.9 | 1.6 |
| EPDM 3 | examples 3 and 4 | 0.3 | 0.2 | 0.9 | 0.8 | 0.8 | 0.7 |
| EPDM 4 | examples 5 and 6 | 2.6 | 2.4 | 2.2 | 2 | 1.9 | 1.8 |

What is claimed is:

1. Multi-layer moulding, containing a body part and a surface layer which at least partly covers the body part, which body part contains a cross-linked elastomer composition which contains oil, which oil has an aromatic compounds content of less than 2 wt %, and which surface layer contains a thermoplastic elastomer, wherein at the surface layer of the multi-layer moulding, in a weather resistance test according to DIN 75202, in which the surface layer is continuously exposed for 100 hours to light from a xenon light source, which light source is provided with a borosilicate "S" inner filter and a soda lime outer filter, at a relative humidity of 30%, with an intensity of 1.40 W/m$^2$ at 420 nanometres on the surface of the moulding, a black standard temperature of 100° C., in a space with a temperature of 66° C., a colour deviation with ΔE of at most 3.0 develops, measured according to ASTM D 1925.

2. Multi-layer moulding according to claim 1, wherein, in the weather resistance test, the surface layer is exposed for 300 hours.

3. Multi-layer moulding according to claim 1, wherein, in the weather resistance test, the surface layer is exposed for 500 hours.

4. Multi-layer moulding according to claim 1, wherein the elastomer composition of the body part is chosen such that the colour deviation with a ΔE of at most 3.0, measured according to ASTM D 1925, is achieved.

5. Multi-layer moulding according to claim 1, wherein the oil, which oil has an aromatic compounds content of less than 1 wt. %.

6. Multi-layer moulding according to claim 1, wherein the oil has a polar compounds content of less than 0.5 wt. %.

7. Multi-layer moulding according to claim 1, wherein the oil has a polar compounds content of less than 0.2 wt. %.

8. Multi-layer moulding according to claim 1, wherein the elastomer composition of the body part contains an elastomer obtained by the polymerization of ethene and an α-olefin.

9. Multi-layer moulding according to claim 1, wherein the elastomer composition of the body part contains an EPDM elastomer obtained by the polymerization of ethene, an α-olefin and a non-conjugated polyene.

10. Multi-layer moulding according to claim 1, wherein the thermoplastic elastomer composition of the surface layer contains a TPV.

11. Multi-layer moulding according to claim 1, wherein the thermoplastic elastomer composition of the surface layer contains one or more UV stabilizers.

12. Multi-layer moulding according to claim 1, wherein the surface layer has a white tint or a chromatic colour.

13. Multi-layer moulding according to claim 1, wherein the moulding chosen is a profile or a hose.

* * * * *